United States Patent [19]

Kubiatowicz

[11] 4,281,569
[45] Aug. 4, 1981

[54] CLAY CUTTING LATHE AND METHOD

[75] Inventor: James F. Kubiatowicz, Minneapolis, Minn.

[73] Assignee: Custom Concepts, Incorporated, Minneapolis, Minn.

[21] Appl. No.: 107,866

[22] Filed: Dec. 28, 1979

[51] Int. Cl.³ .............................................. B23B 3/00
[52] U.S. Cl. .................................. 82/1 C; 82/2 R; 82/1 R; 82/4 R; 142/1; 142/43; 144/1 R
[58] Field of Search ............... 82/1 R, 1 C, 4 R, 2 R; 142/1, 21, 43; 144/1 R, 3 R

[56] References Cited

U.S. PATENT DOCUMENTS

| | | | |
|---|---|---|---|
| 294,601 | 3/1884 | Farley | 142/43 |
| 490,206 | 1/1893 | Lear | 142/43 |
| 491,941 | 2/1893 | Hill | 142/43 |
| 1,104,040 | 7/1914 | Eastman | 142/1 |
| 1,757,155 | 5/1930 | Witt | 142/21 |
| 3,316,946 | 5/1967 | Ryan et al. | 144/1 R |
| 4,217,799 | 8/1980 | Faris | 82/1 C |

*Primary Examiner*—Harrison L. Hinson
*Attorney, Agent, or Firm*—William L. Huebsch

[57] ABSTRACT

A lathe comprising a rotor assembly which may be manually rotated and which has a peripheral portion around which moist pottery clay may be packed. A first cutting member can be mounted on a tool support for the lathe and used to cut grooves into the clay generally to the depth at which the surface of the object will be formed, whereupon a second cutting member with a continuous edge can be mounted on the tool support and used to cut away the clay ridges and shape the finished surface on the object. The object is then allowed to dry, which releases it from the rotor assembly.

12 Claims, 5 Drawing Figures

CLAY CUTTING LATHE AND METHOD

BACKGROUND OF THE INVENTION

The present invention relates to devices and methods for making decorative objects from pottery clay.

While devices used for making decorative objects from clay such as potter's wheels are well known in the prior art, typically the methods of forming objects using such devices have required more manual dexterity and skill than is possessed by most persons.

SUMMARY OF THE INVENTION

The present invention provides a lathe-like device and method by which persons with little or no skill at working with clay, including children, can easily make intricate decorative spool-like clay objects including such objects as game pieces (e.g., the pieces used in chess), napkin rings, candlestick holders, or bowls.

According to the present invention there is provided a lathe-like device or lathe comprising a rotor assembly which may be rotatably mounted on a base for the device and manually rotated about its axis via a crank included in the rotor assembly, which rotor assembly has a peripheral portion around which pottery clay may be packed; a tool support mounted on the base for movement in a direction generally perpendicular to the axis of the rotor assembly; and means for defining two cutting members including a first cutting member having spaced projecting grooving teeth, the distal ends of which grooving teeth define generally the same shape as one side of the object to be formed, and the other of which cutting members has a continuous cutting edge that is essentially the same shape as the side of an object to be formed; either of which cutting members is adapted to be mounted on the tool support with its teeth or cutting edge adjacent the rotor assembly and to be moved with the tool support so that its teeth or continuous cutting edge move radially of the rotor assembly into cutting engagement with clay around the rotor assembly.

The method for cutting predetermined spindle-like objects from pottery clay using the lathe comprises packing the clay around the rotor assembly into a somewhat cylindrical mass; rotating the rotor assembly; cutting grooves into the clay generally to the depth at which the surface of the object will be formed to form spaced radially projecting clay ridges by moving the ends of the spaced grooving teeth of the first cutting member radially into cutting engagement with the rotating clay; and then cutting away the clay ridges and shaping the finished surface on the object by moving the continuous cutting edge on the second forming member radially into cutting engagement with the rotating clay. The object is then allowed to dry, which causes it to release from the rotor assembly, and the clay object can be finished as by applying acrylic paint or another suitable finishing material to its surface.

By such a lathe and method, pottery clay can consistently and accurately be cut into very useful and decorative spool-like objects even by persons who have little or no skill at working with clay.

BRIEF DESCRIPTION OF THE DRAWING

The present invention will be further described with reference to the accompanying drawing where like numbers refer to like parts in the several views, and wherein.

DESCRIPTION OF THE PREFERRED EMBODIMENT

Figure 1:
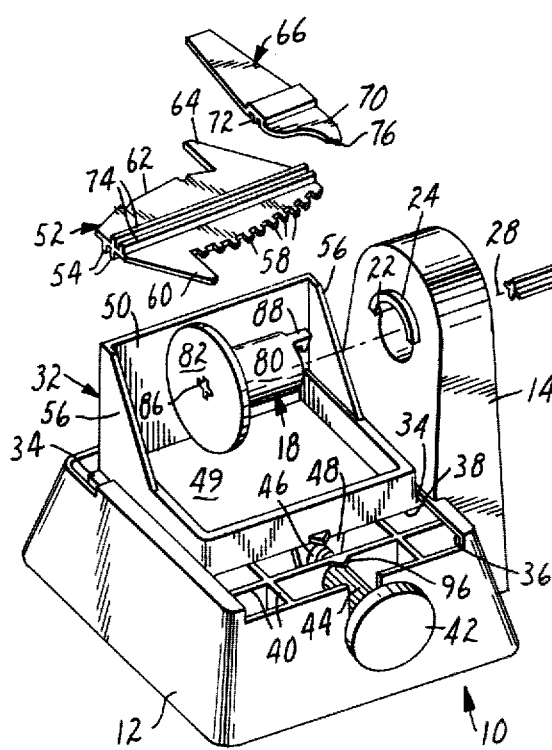
FIG. 1 is an exploded perspective view of a lathe according to the present invention for cutting spool-like objects from moist pottery clay.

Referring now to the drawing there is shown in FIG. 1 a lathe-like device or lathe 10 according to the present invention for cutting decorative spool-like objects 11 (FIG. 4) from moist pottery clay. The lathe 10 is preferably molded of a polymeric material (e.g., high-impact styrene) and comprises a base 12 adapted to be supported on a horizontal surface and including an upwardly projecting support post portion 14 on one side; and a rotor assembly 26 including a spool 18, a drive crank 20, and means for releasably engaging the spool 18 and drive crank 20 together through an opening 22 of a bearing 24 in the support post portion 14. The rotor assembly 26 is adapted to have moist pottery clay packed into a generally cylindrical mass 25 (FIG. 2) around a portion of its periphery, and to be manually rotated in the bearing 24 about its axis 28 via a crank handle 30.

The lathe 10 also includes a tool support 32 mounted on the base 12 (via rails 34 along its opposite edges received in opposed grooves 36 in the base 12, and a planar bottom surface 38 on the tool support 32 slidably supported on the upper edges of vertical intersecting walls 40 formed in the base 12) for movement in a direction generally perpendicular to the axis 28 of the rotor assembly 26. Such movement of the tool support 32 can be caused by manual rotation of a knob 42 fixed at the end of a shaft 44 rotatably mounted and restrained against axial movement in the base 12, and having a threaded end portion 46 threadably engaged in a depending boss 48 fixed on the tool support 32. The tool support 32 has a pan-like portion 49 projecting under the portion of the rotor assembly 26 around which clay is packed, which pan-like portion 49 is adapted to catch and collect water used during the cutting process. The tool support 32 also includes a vertical upwardly projecting end wall at one edge of the pan-like portion 49, which end wall has an upper edge portion 50 on which a cutting plate 52 may be mounted by positioning spaced mounting bars 54 formed on the cutting plate 52 on opposite sides of the upper edge portion 50 and between side walls 56 of the tool support 32 with either of two opposite edge portions on the cutting plate 52 adjacent and radially projecting toward the rotor assembly 26.

One of the edge portions on the cutting plate 52 has a plurality of spaced projecting grooving teeth 58, the distal ends of which grooving teeth 58 define generally the same shape as one side surface of an object to be made, together with a triangular cutoff tooth 60 that extends substantially past the spaced grooving teeth 58; whereas the other edge portion has a continuous cutting edge 62 of essentially the same shape as an object to be made which ends at one end at a triangular cutoff tooth 64 similar to the tooth 60.

The lathe 10 also includes a cutting bar 66 including a narrow projecting tooth 70 projecting from one end, and having a central transverse rail 72 adapted to engage between and slide along mating straight guide rails 74 on the side of the cutting plate 52 opposite its mounting bars 54 with the tooth 70 of the cutting bar 66 projecting past the grooving teeth 58 on the cutting plate 52. The tooth 70 has a notched cutting edge 76 disposed at an angle of about 45 degrees with respect to the rails 72 so that when the cutting bar is moved along the guide rails 74 with its cutting edge 76 leading, its cutting edge 76 will be angled at around that same angle with respect to the axis of the rotor assembly 26 and when it engages the rotating clay mass 25 will efficiently cut straight sides on the mass and give it a new shape (e.g., typically either cylindrical or frustro-conical) that approximates the shape that will be cut by the grooving teeth 58 and the continuous edge 62.

The cutting edges on the grooving teeth 58 and the cutting bar 66 and the continuous edge 62 are preferably formed by an intersection of an edge surface of the cutting plate 52 or cutting bar 66 with its upper surface at an angle of about 45 degrees so that clay rotated into engagement with the cutting plate 52 or cutting bar 66 by rotation of the rotor assembly 26 in a clockwise direction (when viewed from the side of the support post portion 14 on which the crank handle 30 is located) will first engage those cutting edges.

The grooving teeth 58 have widths in the range of about 3/64 inch to 3/32 inch (preferably 1/16 inch) and are each spaced from the adjacent grooving teeth 58 by a distance also in that range and preferably equal to the width of the teeth 58. The slots between the teeth formed by such spacing preferably have depths of about ⅛ inch.

The drive crank 20 and spool 18 can be assembled into the rotor assembly 26 through the bearing opening 22 by sliding a cylindrical portion 80 of the spool 18 (which fits closely within the bearing 24) into the bearing 24 with a radially projecting disc 82 at one end of the spool 18 over the tool support 32, inserting a ridged shaft 84 of the drive crank 20 through a mating axially extending central orifice 86 through the spool 18 until a hook-like projection 88 projecting at the end of the spool 18 opposite the flange 82 passes through an opening 90 in a radially extending plate-like portion 92 of the drive crank 20 and releasably engages an edge of the plate-like portion 92. The rotor assembly 26 is then manually rotatable via the crank handle 30 and is restrained against axial movement via engagement of a collar 94 of the spool 18 and a plate-like portion 92 of the crank handle 30 against opposite ends of the bearing 24. Also, a portion of the ridged shaft 84 extends past the flange 82 along the tool support 32 and defines with an adjacent smooth surface of the disc 82 a portion of the periphery of the rotor assembly 26 about which clay may be packed.

The clay to be formed on the lathe 10 is preferably that known as moist pottery clay for molding, sculpture and firing which is available in many craft stores, such as the clay available from AMCO of Indianapolis, Indiana. Such clay, when moist, will adhere tenaciously to the smooth surface of the disc 82 so that it turns with the spool 18, but upon drying will release from the disc 82.

Figure 2:
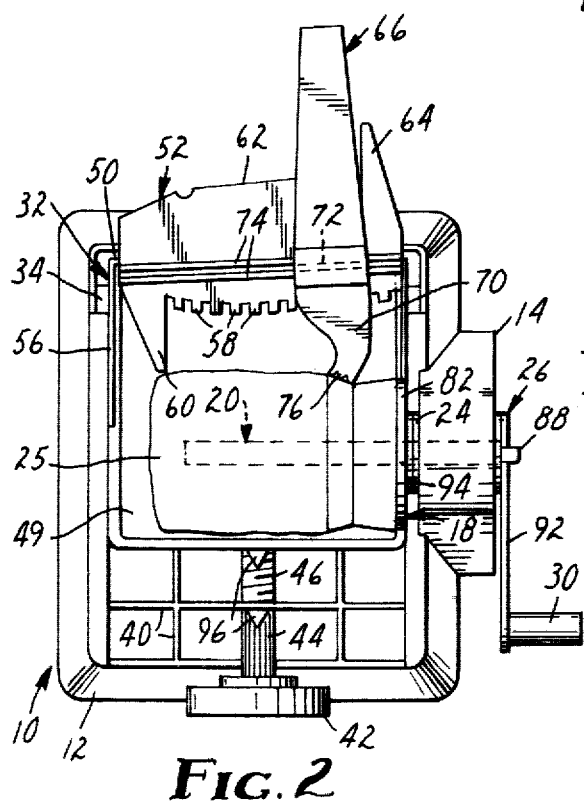

To cut a clay object using the lathe 10, a user first assembles the rotor assembly 26 as described above and then packs clay around the extending portion of the ridged shaft 84 and against the smooth surface of the disc 82 into a roughly cylindrical clay mass 25 (FIG. 2).

The user then positions the cutting plate 52 on the upper portion 50 of the tool support 32 with the grooving teeth 58 adjacent the rotor assembly 26, rotates the knob 42 to bring the forming plate 52 close to (but not touching) the the clay mass 25, rotates the clay mass 25 via the crank handle 30, and moves the cutting bar 66 along the rails 74 (FIG. 2) while applying water to the clay so that the cutting edge 76 on the tooth 70 of the cutting bar 66 cuts straight sides on the mass and forms the mass 25 into a shape roughly approximating the shape of the object to be formed by the cutting plate 52. If the clay then has any holes in its surface, they may be filled with more clay and the step repeated.

Figure 3:
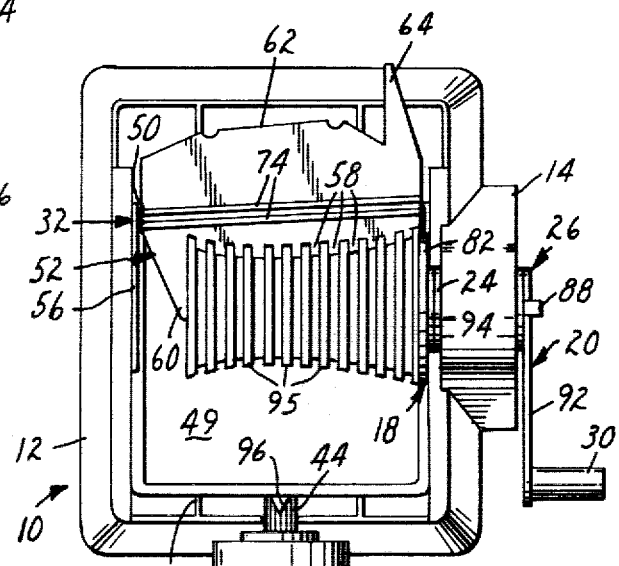
FIGS. 2 through 4 are horizontal plan views of the lathe of FIG. 1 illustrating certain method steps according to the present invention for cutting spool-like objects from moist pottery clay.

The user then removes the cutting bar 66 and, while rotating the rotor assembly 26 and applying more water to the clay, turns the knob 42 to move the grooving teeth 58 into cutting engagement with the clay. This causes the grooving teeth 58 to cut grooves into the clay and form radially projecting ridges 95 between the grooves, and causes the cutoff tooth 60 to cut the clay to length (FIG. 3).

Figure 4:
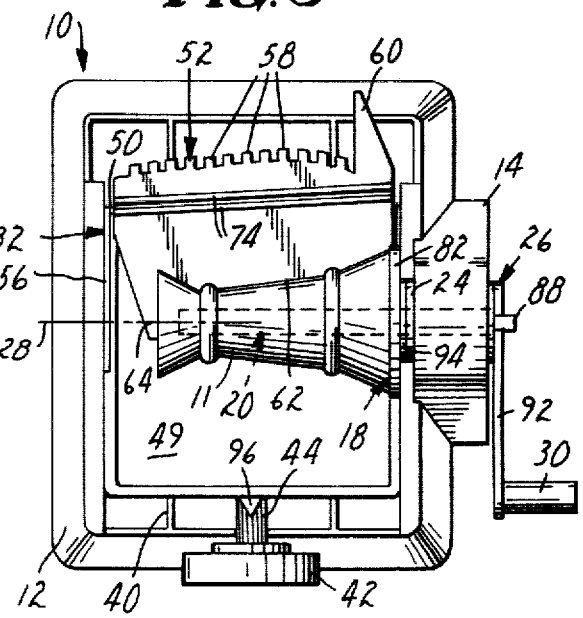

Next the tool holder is moved away from the clay via the knob 42, and the cutting plate 52 is lifted off the tool support 32, rotated 180 degrees and repositioned on the upper portion 50 of the tool support 32 with the continuous cutting edge 62 adjacent the ridged clay. The knob 42 is again rotated to move the continuous edge 62 into cutting engagement with the clay to cut off the ridges 95 and shape a finished surface on the object 11 (FIG. 4). Such rotation of the knob 42 is facilitated by calibrating marks around the shaft 44 and a pointer 96 on the base 12, which helps the user determine the rate at which the knob 42 should be rotated to move the continuous cutting edge 62 into engagement with the clay. Water is also added to the clay during this step.

After the surface of the object is completely cut, the user removes the hook-like member 88 from the drive crank 20, withdraws the drive crank 20 from the object and the spool 18, and withdraws the spool 18 from the bearing 24. The object will still adhere to the smooth surface of the disc 82 because of the moisture content in the clay. The object can then be dried on the spool 18, whereupon the object will release from the disc 82. The surface of the dried object can then be finished as with acylic paint or another suitable finishing material.

ALTERNATE EMBODIMENTS

Figure 5:
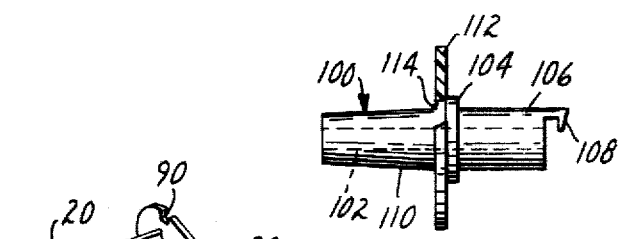
FIG. 5 is a side view showing an alternate embodiment for a spool used on the lathe of FIG. 1 having a part broken away to show details.

By using integral cutting plates having various shapes, objects of many different and varied shapes may be formed. Additionally, objects having large center openings (such as napkin rings) may be formed by using a spool 100 having the shape illustrated in FIG. 5 instead of the spool 18. The spool 100 has a central opening 102, collar 104, cylindrical portion 106, and projecting hook-like member 108 having essentially the same shape as the corresponding portions of the spool 18. Unlike the spool 18, however, the spool 100 has a slightly tapered projecting hub 110 (e.g., 5° taper) on its end opposite the hook-like member 108, which hub 110 has an outside diameter generally the same size as the desired center opening in the object. Also the spool 100 includes a removable disc 112 having smooth side surfaces and a central opening so that the disc 112 may be slid over the hub 110 against the collar 104, and will be rotatably driven with the hub via a drive lug 114 which engages a notch opening into the central opening of the disc 112. Clay to be formed is pressed around the hub 110 and formed a via a cutting plate via the method described above. Subsequently, the disc 112 is slid off of the hub 110 and carries the formed object with it, which object will release from the disc 112 upon drying.

Bowls may be cut through the use of a spool (not shown) similar to the spool 100 (but in which spool the portion of the hub projecting past the disc has the same surface shape as is desired for the inner surface of a bowl to be cut) by packing clay around the hub against the disc, cutting the outer surface and base of the bowl via an appropriate cutting plate; pushing the bowl off the hub via a removable disc and drying the bowl so that it releases from the disc.

I claim:

1. A lathe for cutting moist clay into spindle-like objects, said lathe comprising:

a base;

a rotor assembly having an axis and adapted to have clay packed around a portion of its periphery;

means for mounting the rotor assembly on said base for rotation about said axis;

a tool support member;

means mounting said tool support member on said base for movement in a direction generally perpendicular to said axis;

means for providing a first cutting member comprising a plurality of spaced projecting grooving teeth with the distal ends of said teeth defining generally the same shape as one side surface of a said object to be formed; said first cutting member being adapted to be mounted on said tool support member with said teeth projecting radially toward the axis of said rotor assembly;

means for defining a second cutting member having a continuous cutting edge of essentially the same shape as one side surface of the object to be formed, said second cutting member being adapted to be mounted on said tool support member with said continuous cutting edge projecting radially toward the axis of said rotor assembly; and means for moving said tool support member along said means for mounting to engage one of said cutting members supported on said tool support with clay packed around and being rotated with said rotor assembly.

2. A lathe according to claim 1 further including a cutting bar having a narrow cutting edge and means mounting said cutting bar on said tool support for straight-line movement along a path generally aligned with the ends of said grooving teeth on said cutting member to cut clay packed around and being rotated with said rotor assembly into a straight-sided shape approximating the shape of said object.

3. A lathe according to claim 1 comprising a cutting plate having opposite edge portions defining said first and second cutting members, and means between said opposite edge portions adapted for engaging said tool support to mount said cutting plate on said tool support with either of said edge portions adjacent said rotor assembly.

4. A lathe according to claim 1 wherein the grooving teeth of said first cutting member have generally the same width as the spaces between said teeth.

5. A lathe according to claim 1 wherein said grooving teeth and the spaces between said grooving teeth both have widths in the range of 3/64 inch to 3/16 inch.

6. A lathe according to claim 3 wherein said tool support member comprises a pan-like portion projecting under the portion of said rotor assembly around which clay is packed to catch water applied to the clay during cutting, and has an upwardly projecting portion at one edge of said pan-like portion on which said cutting plate is mounted.

7. A lathe according to claim 1 wherein said rotor assembly comprises a spool having a central axially extending orifice, and a radially extending disc having a smooth radial surface about said axis; a drive crank including a shaft portion, and a handle portion including a part projecting at right angles to said shaft portion at one end of said shaft portion; and means adapted for releasable engagement between said spool and said drive crank when said shaft portion of said crank is in the orifice of said spool; said base has a vertical projection having a bearing opening, and said rotor assembly is adapted to be assembled through said bearing opening with said crank handle on one side of said vertical projection, said flange on the other, and said means engaged.

8. A lathe according to claim 7 wherein said disc has a central opening, said spool has a portion adapted to project through the central opening in said disc, and said spool and disc include means adapted for driving engagement to rotate said disc with said spool.

9. A method for cutting predetermined spindle-like objects from moist clay comprising the steps of:

packing the clay around a rotor assembly into a somewhat cylindrical shaped clay mass;

rotating the rotor assembly to rotate the clay mass;

cutting grooves in the clay to a depth at which the surface of the object will be formed to form spaced annular clay ridges;

cutting away the ridges and shaping the surface of the spindle-like object;

wetting the clay with water during said cutting steps; and removing the finished spindle-like object from the rotor assembly.

10. A method according to claim 9 further including the step of cutting straight sides on the clay mass to give the clay a shape approximating the shape of the object prior to said other cutting steps.

11. A method according to claim 9 wherein said first cutting step comprises moving a cutter comprising a plurality of spaced projecting grooving teeth having distal ends defining generally the shape of one side of the object to be formed radially against the side of the rotating clay mass to form the grooves; and said second cutting step comprises moving a second cutter having a continuous edge of essentially the same shape as the side of the object to be formed radially against the side of the ridged and grooved rotating clay mass to cut away the ridges and shape the surface of the spindle-like object.

12. A method according to claim 9 wherein said packing step includes packing the clay against a radially extending smooth surface on a disc to provide driving engagement between the rotor assembly and the clay, and said removing step comprises allowing the clay to dry so that it releases from the disc.

* * * * *